United States Patent [19]

Missimer et al.

[11] Patent Number: 4,535,597
[45] Date of Patent: Aug. 20, 1985

[54] FAST CYCLE WATER VAPOR CRYOPUMP

[75] Inventors: Dale J. Missimer, San Anselmo; Michael R. St. Pierre, Petaluma, both of Calif.

[73] Assignee: Marin Tek, Inc., San Rafael, Calif.

[21] Appl. No.: 573,679

[22] Filed: Jan. 25, 1984

[51] Int. Cl.³ .............................................. B01D 8/00
[52] U.S. Cl. ..................................... 62/55.5; 55/269; 62/268; 62/278
[58] Field of Search ................ 62/114, 278, 55.5, 100, 62/268; 55/269; 417/901

[56] References Cited

U.S. PATENT DOCUMENTS

| | | | |
|---|---|---|---|
| 2,041,725 | 5/1936 | Podbielniak | 62/114 |
| 3,012,415 | 12/1961 | La Porte | 62/278 |
| 3,203,194 | 8/1965 | Fuderer | 62/114 |
| 3,579,998 | 5/1971 | Thibault et al. | 62/55.5 |
| 3,677,025 | 7/1972 | Payne | 62/278 |
| 3,768,273 | 10/1973 | Missimer | 62/114 |

Primary Examiner—Ronald C. Capossela
Attorney, Agent, or Firm—Jay M. Cantor

[57] ABSTRACT

The disclosure relates to a closed circuit refrigerator having both rapid heating/defrost and cooling rates for the cryosurface and which operates on a continuous basis. The system is based upon a refrigeration process of the type which employs compression of a mixture of vapor refrigerant components with partial condensation and partial evaporation with steps of intermediate cooling and at least partial phase separation. The evaporator of the refrigeration system is placed in a vacuum system as a "Meissner" coil. The cryosurface has, thermally coupled thereto, both a defrost tube and an evaporator tube, the defrost tube carrying refrigerant fluid therein at raised temperature when made operational during a defrost cycle and the evaporator tube carrying low temperature refrigerant fluid therein when made operational during a cool down operation. Appropriate valves determine the refrigerant fluid both, i.e., through cooling heat exchangers or through a heating heat exchanger.

6 Claims, 1 Drawing Figure

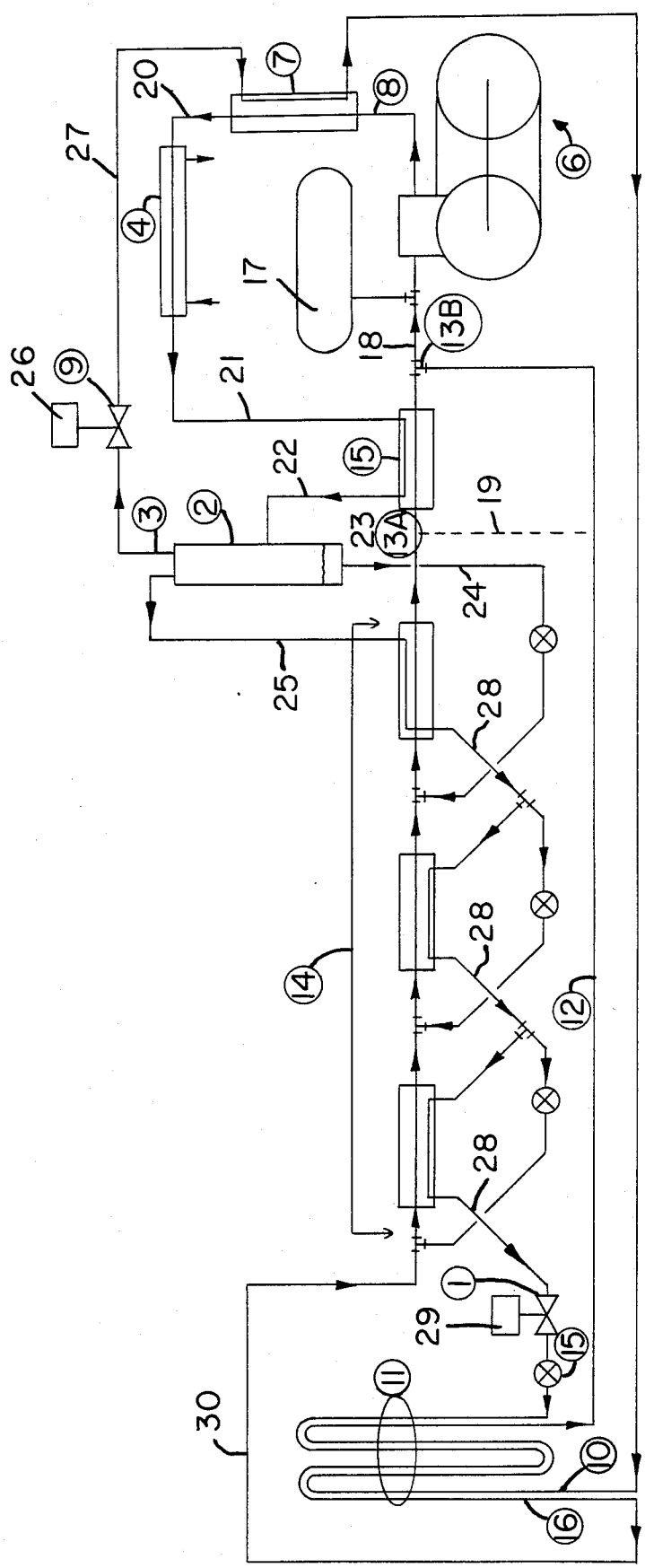

FAST CYCLE WATER VAPOR CRYOPUMP

BACKGROUND OF THE INVENTION

1. Field of the Invention

This invention relates to high vacuum water vapor cryopumps.

2. Description of the Prior Art

High vacuum chambers used for production processes, as well as research and development, are evacuated by a variety of means including mechanical or sorption "roughing" pumps for preliminary stages, and then diffusion-, turbomolecular-, ion-, titanium sublimation-, and most recently, helium refrigeration (cryo)-pumps. Those in the latter group are considered high vacuum pumps which are suitable for operation in the deeper vacuum range after the chamber has been "roughed" down to a "crossover" pressure. This "crossover" pressure depends upon the gas load tolerance of the high vacuum pump. The high vacuum pump is started long before the "crossover" pressure is reached, and is usually operated continuously, but isolated from the chamber by a large aperture valve located in a suitable manifold or port. When the high vacuum isolation valve is opened and "rough" pumping is stopped, the chamber is pumped at a high rate by the high vacuum pump to its operating pressure level.

Gas loads in the chamber vary considerably from one application to another. Initially, the air gases including nitrogen, oxygen, and water vapor are removed. Later in the pumpdown process, water vapor becomes the dominant gas due to desorption from internal surfaces. Some plasma processes require introduction of inert gases such as argon and reactive gases such as oxygen or halogens. In such cases, it is desirable to pump water vapor at high speeds, without removing the introduced gases too fast, that is, to selectively pump the gases. Water vapor can dissociate and create undesirable oxygen and hydrogen gases.

Pumps vary in their ability to remove different gas species, depending upon their operating principles. A combination of more than one type of high vacuum pump may be desirable. One solution to the problem of high water vapor loads was introduced in the 1950s by C. R. Meissner. A light weight coil of tubing, placed directly in the vacuum chamber, is cooled by liquid nitrogen flowing through it. A Meissner coil cryopumps water vapor at high rates. Unfortunately, it also cryopumps $CO_2$. This disadvantage is discussed in more detail hereinbelow. The coil must be quickly warmed when the vacuum chamber is to be opened to atmosphere to preclude moisture condensation from the room. This is usually done using heated and pressurized nitrogen gas to expel liquid nitrogen and to warm the coil. After the chamber is unloaded, reloaded, and roughed down, the Meissner coil is quickly recooled concurrent with opening the high vacuum valve and using the high vacuum pump for pumping of the chamber.

Another method of removing water vapor at high rates, with limited pumping of gases such as argon, uses a modified helium cryopump with a throttle attached to the warmer first refrigeration stage. The throttle is cold enough to cryopump water vapor, but permits argon and other "permanent" gases to pass on (at restricted flow) and be pumped by first and second stages.

Most high vacuum pumps are not capable of being started at atmospheric pressure but rather they must be isolated from the chamber by a valve. The valve, a manifold, if present, and aperture between the chamber and pump all reduce gas conductance to the pump with a resulting pumping speed reduction. Larger or additional pumps, can be added to handle large pumping loads. Usually, the largest load (65-95%) is water vapor, therefore gas pumping speeds do not accurately match the load.

Meissner coils, which are placed directly in chambers and used as supplemental pumps for cryopumping water vapor, are costly to operate because of continuous and wasteful nitrogen consumption, have some inherent safety problems, and are difficult to warm up to room temperature in less than five minutes. Also, they operate so cold that they cryopump or cryotrap some $CO_2$ vapors at typical processing pressures. The chamber pressure then can seriously fluctuate if the coil temperature varies more than 0.1 deg C. It is difficult to control surface temperatures this close, and liquid entrainment in exhausting vapors occurs as a consequence.

Helium cryopumps pump water vapor about three times as fast as air, or $3\frac{1}{2}$ times as fast as argon, but still not proportional to typical gas loads. Also, because they are capture pumps, they must be periodically regenerated to dispose of captured gases. A total regeneration cycle requires about three to four hours and the chamber can not be used during this period. Care must be taken in removal of gases from the cryopump during regeneration. Cooling capacity is quite limited and they are unable to handle significant thermal radiation heat loads, e. g., viewing surfaces above about 50° C. Periodic changing of a helium purifying cartridge is also required. Helium cryopumps with refrigerated throttle devices have two potential problems: (1) cryopumping action of water vapor is far removed from the vapor source and is somewhat conductance limited by an aperture and high vacuum valve, and (2) the throttle limits the pumping of all gases including hydrogen and oxygen which is undesirable.

SUMMARY OF THE INVENTION

In accordance with the present invention, the above noted problems of the prior art are minimized and there is provided a "Meissner" cryosurface which can be mounted directly in a vacuum chamber workspace, thereby circumventing water vapor pumping speed (conductance) limits created by apertures, manifolds, and high vacuum valves, using a closed circuit refrigerator to eliminate wastes, costs, hazards and control problems associated with using liquid nitrogen. The present system has both rapid heating/defrost and cooling rates for the cryosurface to allow it to be used in chambers periodically cycled to atmospheric pressure, this being a common mode of operation for batch processes. With rapid cycle capability and periodic defrost, it is not necessary to dispose of large amount of trapped water vapor. The cryosurface operates at a temperature sufficiently cold to cryopump water vapor efficiently to a low $10^{-8}$ torr. range, but not so cold as to cryopump $CO_2$, that is, to operate as a selective cryopump. The system operates on a continuous basis so there are no short term temperature fluctuations and therefore there are no undulating chamber pressures caused by vapor pressure changes of trapped materials. The subject system further eliminates the need for liquid refrigerant re-evaporator(s), suction line liquid refrigerant accumulators, or outside sources of heat for defrost as required in many conventional refrigeration defrost systems.

Briefly, the system is based upon a refrigeration process of the type described in U.S. Pat. No. 3,768,273 (Missimer), but can also be adapted to U.S. Pat. Nos. 3,203,194 (Fuderer) or 2,041,725 (Podbielniak). All employ compression of a mixture of vapor refrigerant components with partial condensation and partial evaporation with steps of intermediate cooling and at least partial phase separation. In the adaptation described, the evaporator of the refrigeration system is placed in a vacuum system as a "Meissner" coil described above.

The cryosurface has, thermally coupled thereto, both a defrost tube and an evaporator tube, the defrost tube carrying refrigerant fluid therein at raised temperature when made operational during a defrost cycle and the evaporator tube carrying low temperature refrigerant fluid therein when made operational during a cool down operation. Appropriate valves determine the refrigerant fluid both, i.e., through cooling heat exchangers or through a heating heat exchanger.

BRIEF DESCRIPTION OF THE DRAWING

The drawing is a schematic diagram of refrigerant flow in accordance with the present invention.

DESCRIPTION OF THE PREFERRED EMBODIMENT

Referring now to the drawing, there is shown a preferred embodiment of a fast cycle water vapor cryopump in accordance with the present invention. The system includes a compressor 6 which receives refrigerant from a refrigerant storage tank 17 and from the line 18 which receives refrigerant either from the defrost vapor return tube 12 or from the auxiliary condenser 5. The auxiliary condenser 5 is used in this path when a short term defrost cycle is to be used as shown by the line 19 in phantom. If a long defrost period is to be used, the auxiliary condenser 5 is by passed. The compressor 6 feeds a discharge line 8 which passes the refrigerant fluid through a heating heat exchanger 7 to a condenser 4 via line 20 and then through the auxiliary condenser 5 via the line 21 to a phase separator 2 via the line 22. The phase separator retains liquid refrigerant 23 at its bottom for exit via line 24 and also passes gaseous refrigerant to the intermediate cold heat exchanger 14 via line 25 and via line 3 to valve 9 operated by solenoid 26. The refrigerant continues via line 27, heat exchanger 7 and defrost tube 10 which is thermally coupled to cryosurface 11 to defrost vapor return tube 12.

The refrigerant passing along line 25 passes through the intermediate cold heat exchanger 14 which cools the refrigerant and pass it via a line 28 either to another element of the heat exchanger 14 or, via valve 1 operated by solenoid 29 to a throttling device 15. The cooled refrigerant then travels along the evaporator tube 16 which is thermally coupled to the cryosurface 11. The refrigerant then travels along line 30 through the heat exchanger 14 back to the auxiliary condenser 5. Also, the refrigerant is recycled in the heat exchanger 14 during a defrost cycle to maintain refrigerant in the cooled down condition for the next cooldown cycle.

For operation in the defrost mode, cooling is turned off by closing liquid refrigerant solenoid valve 1. Cool compressed vapor is removed from the top of phase separator 2 by tube 3. This vapor is nearly oil-free and has little of the higher boiling components remaining because of cooling and partial condensation in condenser 4 and auxiliary condenser 5, and phase separation in separator 2 of the refrigerant mixture circulated by compressor 6.

This vapor, stripped of oil and higher boiling fractions, is heated to a temperature of +50° to +120° C. in heat exchanger 7. Solenoid operated valve 9 opens to admit the hot defrost vapors to tube 10 bonded thermally to the cryosurface 11, but with separate flow passages. Heat is transmitted from the defrost vapors to cryosurface 11 almost entirely by sensible heat transfer with minimal condensation (latent heat change). This is due to the composition of the vapors and the combination of pressures and temperatures through defrost tube 10 bonded in the cryosurface.

Defrost vapor, almost entirely free of condensate after giving up its heat to the cryosurface 11, is returned to the compressor 6 via tube 12, entering at a point either ahead of (13A) or after (13B) auxiliary condenser 5, depending upon desired method of operation. For short term defrost, point 13A is suitable because of added cooling of auxiliary condenser 5 by initial return of cool defrost vapor. If long defrost periods are anticipated, point 13B is best. Returning defrost vapor by-passes and therefore does not add heat to intermediate cold heat exchangers 14. In fact, some precooling of cold heat exchangers 14 can be accomplished in this period, thereby leading to more rapid recooling after defrost. Defrost vapor return tube 12, which is near room ambient at the start of the defrost cycle, evaporates any small amount of condensate formed in cryosurface 11 during the defrost cycle.

Some thermal storage of heat for defrost is accomplished by preheating discharge heat exchanger 7 during normal operation. The primary heat source for defrost is heat of compression which is transferred to cryosurface 11 by vapor transport. No liquid refrigerant re-evaporator, used in many conventional hot gas refrigeration systems, is required.

A suitably designed system can attain full defrost (regeneration) of cryosurface 11 within two minutes. At termination of defrost (as determined externally), solenoid valve 9 is closed and the system enters into a "dwell" mode.

For operation in the dwell mode, both solenoid valves 1 and 9 remain closed while intermediate cold heat exchangers 14 are precooled and compressor 6 continues to operate under reduced load conditions. At this time, cryosurface 11 is neither heated nor cooled. It equilibrates with its surroundings, usually from a temperature warmer than ambient. Its exterior surface temperature is above ambient dewpoint and no moisture condensation occurs. The system is now ready for recooling and cryopumping.

For the cooldown and cryopumping mode, solenoid operated valve 1 is opened. Liquid refrigerant flows through throttling device 15 to evaporator tube 16 where it boils at low temperatures. This refrigerates cryosurface 11, which consists of evaporator tube 16 thermally bonded to defrost vapor tube 10. Cryopumping commences when a portion of the cryosurface 11 located within the workspace cools to or below the equilibrium temperature (dew point) of water vapor present. In most vacuum applications, the procedure is to turn on such a cryopump at "crossover" pressure when roughing ceases and the high vacuum pump has been opened to the chamber. In this case, cryopumping will start at a cryosurface temperature of about −40° to −60° C. and continues with the cryosurface cooling to a normal operating range of −100° to −140° C.

The entire cryosurface 11 starts cryopumping when all surfaces are colder than ambient vapor equilibrium temperature. If the thermal mass of cryosurface 11 has been properly matched with the refrigeration capacity, and is configured for proper heat transfer, cryopumping will start within one minute, and a fully active surface can be produced within two to five minutes.

The defrost vapor tube 10 cools by heat conduction to evaporator tube 16. The two refrigerant streams remain isolated for the reasons mentioned, primarily to create very rapid temperature transients of the cryosurface. If there were mixing in the evaporator/cryosurface, the series of cold heat exchangers 14 would be warmed during defrost and recooling would require more time.

Supplemental thermal storage for rapid cooling at the start of cryopumping is accomplished by precooling intermediate cold heat exchangers 14 during defrost and dwell periods. During these periods, essentially normal intermediate stage cooling occurs by liquid refrigerant flow from intermediate separation stages. At the end of cooling, as determined by a process cycle, the system is ready for the defrost operation.

This system can be used for other applications in addition to the one described. It is not limited to conditioning of "Meissner" coils in vacuum chambers. For instance, with appropriate modifications, it is possible to use its principles for rapid freezing and thawing of biological materials or for low (and high) temperature testing of component parts over a wide temperature range.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A system for controlling the temperature of a cryosurface wherein the cryosurface is provided with both a defrost tube and an evaporator tube respectively thermally coupled thereto,
   a source of compressed refrigerant,
   heater means,
   means for directing flow of said refrigerant from said source to said heater means to raise the temperature of the refrigerant,
   cooling means,
   means for directing flow of said refrigerant to said cooling means to cool the refrigerant, and
   valve means for selectively controlling the flow of said raised temperature refrigerant into the defrost tube and the cooled refrigerant into the evaporator tube.

2. A system according to claim 1 wherein the defrost and evaporator tubes are further thermally bonded to each other.

3. A system according to claim 1 including means for directing flow of said refrigerant from the outlet of said defrost tube to said cooling means for maintaining the refrigerant in a cooled down condition during a defrost cycle.

4. A system according to claim 3 including further means for directing the flow of defrost vapor from the defrost tube to the source.

5. A system according to claim 1 including a phase separator interposed in the path between the source and the heater means, the vapor portion of said refrigerant being directed from said phase separator to said heater means.

6. A system according to claim 5 wherein the raised temperature refrigerant flowing into the defrost tube is the heated vapor from said heater means.

* * * * *